United States Patent
Trivelpiece et al.

(10) Patent No.: US 11,416,813 B2
(45) Date of Patent: Aug. 16, 2022

(54) SYSTEMS AND METHODS FOR DETERMINING INVENTORY USING TIME-SLOTTED TAG COMMUNICATIONS

(71) Applicants: Craig E. Trivelpiece, Mission Viejo, CA (US); Steve E. Trivelpiece, Rancho Santa Margarita, CA (US)

(72) Inventors: Craig E. Trivelpiece, Mission Viejo, CA (US); Steve E. Trivelpiece, Rancho Santa Margarita, CA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 16/715,754

(22) Filed: Dec. 16, 2019

(65) Prior Publication Data
US 2020/0193365 A1     Jun. 18, 2020

Related U.S. Application Data

(63) Continuation of application No. 15/852,508, filed on Dec. 22, 2017, now Pat. No. 10,510,042.

(60) Provisional application No. 62/565,350, filed on Sep. 29, 2017.

(51) Int. Cl.
   *G06Q 10/08*        (2012.01)
   *G06K 19/07*        (2006.01)
   *G06K 7/10*         (2006.01)

(52) U.S. Cl.
CPC ....... *G06Q 10/087* (2013.01); *G06K 7/10039* (2013.01); *G06K 7/10059* (2013.01); *G06K 7/10366* (2013.01); *G06K 19/0704* (2013.01); *G06K 19/0707* (2013.01); *G06K 19/0716* (2013.01); *G06K 19/0723* (2013.01)

(58) Field of Classification Search
CPC .................................................... G06Q 10/087
USPC ........................................................ 235/385
See application file for complete search history.

(56) References Cited

U.S. PATENT DOCUMENTS

| | | | | |
|---|---|---|---|---|
| 6,366,205 B1 * | 4/2002 | Sutphen | ............. | G08B 21/0227 340/568.1 |
| 2003/0104848 A1 * | 6/2003 | Brideglall | .......... | G06K 7/10297 455/574 |
| 2007/0139162 A1 * | 6/2007 | Bandy | .................. | G06K 7/0008 340/10.2 |

\* cited by examiner

*Primary Examiner* — Rafferty D Kelly
(74) *Attorney, Agent, or Firm* — Arent Fox Schiff

(57) ABSTRACT

Systems and methods for determining an inventory. The methods comprise: placing an RFID tag in a first operational mode in which at least one communication operation or device of the RFID tag is disabled or bypassed; performing first operations by the RFID tag to determine when it is time to begin communications in accordance with the time slotted communications scheme; transitioning an operational mode of the RFID tag from the first operational mode to a second operational mode in which the communication operation(s) or device of the RFID tag is enabled or no longer bypassed, in response to a determination that it is time for the RFID tag to begin communications; and transitioning the operational mode of the RFID tag back into the first operational mode when the RFID tag's communications with a remote tag reader for inventory determination purposes are complete or a time slot has expired.

29 Claims, 11 Drawing Sheets

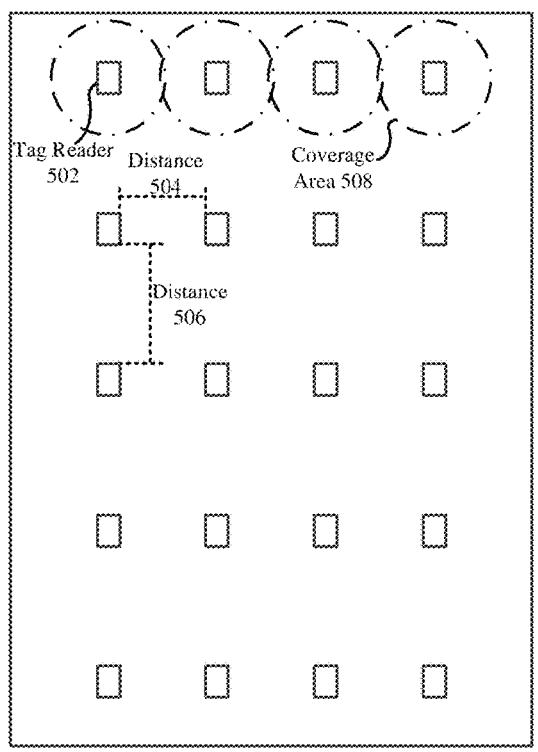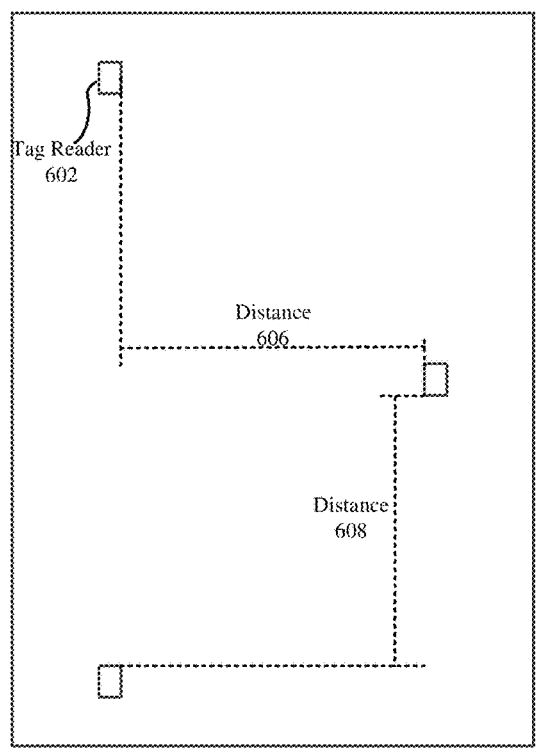
FIG. 5
(Prior Art)
FIG. 6

Tag Response Message 1000

| Unique Tag Identifier 1002 |
|---|

FIG. 10

Tag Response Message 1100

| Unique Tag Identifier 1102 | Motion Indicator 1104 |
|---|---|

FIG. 11

SYSTEMS AND METHODS FOR DETERMINING INVENTORY USING TIME-SLOTTED TAG COMMUNICATIONS

CROSS-REFERENCE TO RELATED APPLICATIONS

This application claims priority to U.S. Provisional Patent Application having Ser. No. 62/565,350 which was filed on Sep. 29, 2017 and is incorporated herein in its entirety.

BACKGROUND

Statement of the Technical Field

The present disclosure relates generally to Radio Frequency Identification ("RFID") systems. More particularly, the present disclosure relates to implementing systems and methods for determining inventory using time slotted tag communications.

Description of the Related Art

Inventory solutions often use passive RFID tags because of their size, cost and mature infrastructure. However, passive RFID was never designed to support the vast number of tags, long read range, large number of readers, fast response times, location detection, and the high accuracy needed for a real-world solution.

Battery Assisted Passive ("BAP") RFID tags greatly help with the read range (increasing the read range from, for example, 1-10 meters to 15-100 meters) but also increase size, cost and complexity. In addition, the batteries must be replaced.

SUMMARY

The present disclosure generally concerns implementing systems and methods for determining an inventory. The methods comprise: placing an RFID tag in a first operational mode in which at least one communication operation or device of the RFID tag is disabled or bypassed; performing first operations by the RFID tag to determine when it is time to begin communications in accordance with the time slotted communications scheme; transitioning an operational mode of the RFID tag from the first operational mode to a second operational mode in which the at least one communication operation or device of the RFID tag is enabled or no longer bypassed, in response to a determination that it is time for the RFID tag to begin communications; and transitioning the operational mode of the RFID tag back into the first operational mode when the RFID tag's communications with a remote tag reader for inventory determination purposes are complete or a time slot has expired.

In some scenarios, the first operational mode comprises a power recharging mode in which a rechargeable power source is charged using harvested ambient energy.

In those or other scenarios, the methods also comprise assigning at least one first time slot of a plurality of time slots to each RFID tag of a plurality of RFID tags in accordance with the time slotted communication scheme. The at least one time slot is assigned to the RFID tag based on the RFID tag's unique code. The RFID tag's unique code includes, but is not limited to, an Electronic Product Code ("EPC"), a Cyclic Redundancy Check ("CRC") code, a hash code or output of a randomizing algorithm. Alternatively or additionally, the at least one time slot is assigned to the RFID tag based a chaotic, random or pseudo-random algorithm.

The RFID tag performs communication operations in time slots of the plurality of time slots that are allocated to other RFID tags, when the RFID tag is in motion. The communication operations are discontinued when motion is no longer detected, a power source of the RFID tag has a certain level of charge, or a control signal for disabling or bypassing the communication operations is received from an external device.

In those or other scenarios, a motion sensor detects motion of the RFID tag. Output data of the motion sensor is used to: (a) trigger an operational mode change by the RFID tag when the RFID tag is in motion; or (b) determine if the detected motion is of a type for triggering communication operations or device enablement. In scenario (b), the operational mode of the RFID tag is transitioned from the first operational mode to the second operational mode, in response to a determination that the detected motion is of a type for triggering communication operations or device enablement. The RFID tag may notify the remote tag reader that motion has been detected by the motion sensor.

In those or yet other scenarios, the RFID tag is transitioned back into the first operational mode when a window of time has expired. A value of the window of time is variable. The value of the window of time is dynamically determined based on at least one of an environmental condition and the system operational condition.

BRIEF DESCRIPTION OF THE DRAWINGS

The present solution will be described with reference to the following drawing figures, in which like numerals represent like items throughout the figures.

FIG. 5 is an illustration of an illustrative tag reader configuration.

FIG. 6 is an illustration of another illustrative tag reader configuration.

FIG. 10 is an illustration of a tag response message.

FIG. 11 is an illustration of another tag response message.

DETAILED DESCRIPTION

Figure 1:
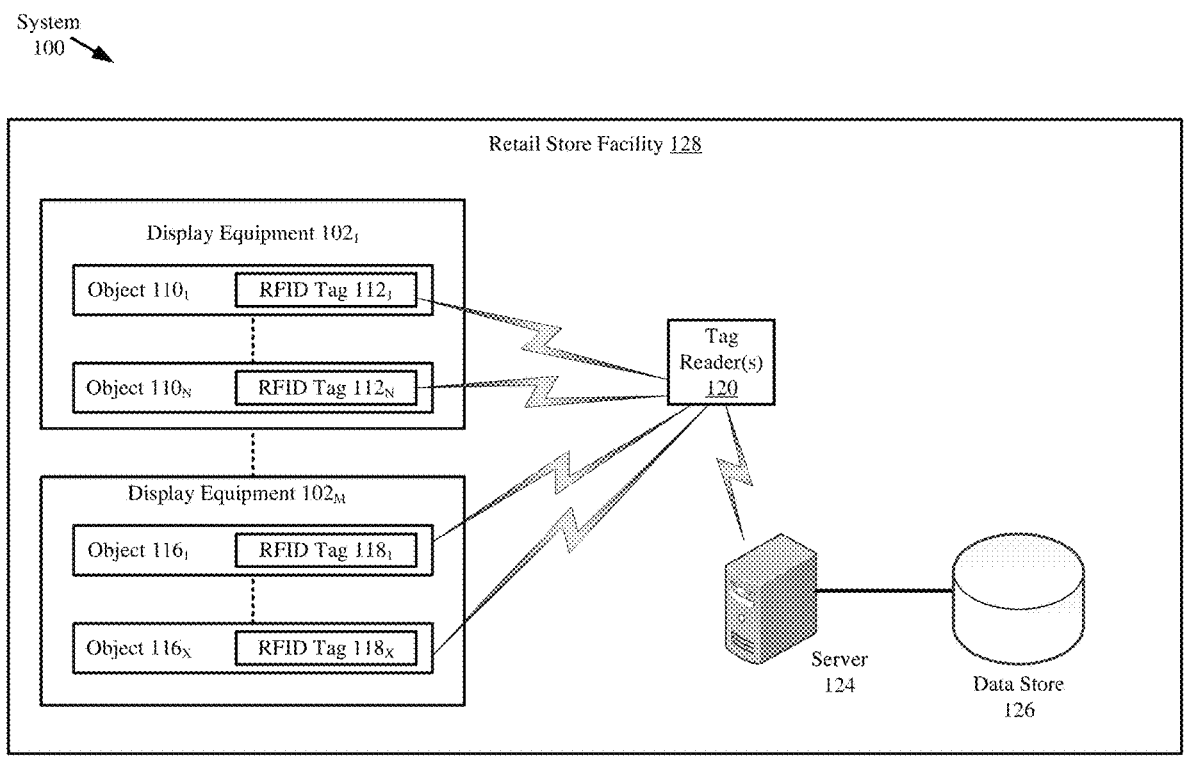
FIG. 1 is an illustration of an illustrative architecture for a system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

There is a need for a solution that improves the read range of a passive RFID tag while keeping size, cost and response time low. In addition, the solution can advantageously include a very small, rechargeable power source (e.g., battery or capacitor) so that it keeps the cost and size low, and eliminates the need for battery changes. Low cost versions can use a non-rechargeable battery when a fixed battery has enough energy to last for the lifetime of the RFID tagged product.

The present solution generally concerns systems and methods for determining inventory using time slotted tag communications. The present solution solves the following problems:

how to have a battery assisted passive RFID tag without constant battery drain caused by constant inventory reading which is needed to monitor tag motion and for full inventory count;

how to have a battery assisted passive RFID tag with great read range without having very large numbers of tags constantly attempting to communicate causing delays and communication collisions;

how to have a battery assisted passive RFID tag that can still be read often enough for a full inventory count in an area; and how to enable detection of a tag that is being moved or stolen.

The present solution can use standard RFID tags and readers (with a software update) but could be designed to incorporate the functioning into a new and compatible RFID tag chip as well. Initially, the RFID tag would need to be supplemented with a rechargeable power source (e.g., a battery and/or a capacitor), a Central Processing Unit ("CPU"), an accelerometer and/or motion detector.

Just as in normal RFID implementations, RFID tag readers are constantly scanning their Field Of View ("FOV") and requesting that all tags in its coverage area respond to interrogation signals. The present solution solves these problems with two novel features: (A) time based RFID tag communications control (e.g., disabling a receiver, disabling a transceiver or transmitter, disabling a communications operation, bypassing a communications device or operation, and/or disabling a response from the RFID tag); and (B) motion based RFID tag communications control. The RFID tag control of (A) involves controlling the RFID tag so that it only enables its communications functionality (e.g., enables a receiver, enables a transceiver or transmitter, enables at least one communications operation, and/or discontinues a bypass of a communications device or operation) periodically under system control. This is for improved static inventory counting. The RFID communications control of (B) involves turning on, enabling or no longer bypassing the RFID receiver, the RFID transceiver/transmitter and/or at least one communications operation when motion is detected and continuing to receive interrogation signals while in motion. This is for loss prevention and tag location tracking.

Novel feature (A) provides better full inventory counts. In the present solution, the RFID chip is scheduled to only enable (or turn on) or no longer bypass its communication device (e.g., a transceiver) or communications operation(s) one or two times a day, and to disable (or turn off) or bypass its communication device (e.g., transceiver) or communications operation(s) after communication with a tag reader completes or a timing window expires. The timing of the RFID tag communications is distributed over a given time period (e.g., a day or 24 hours) so that any time slot will only be assigned to a very small percentage of the RFID tags. This enables fast reading cycles, minimizes communications collisions, and enables identifying every tag.

Novel feature (A) also vastly reduces the RFID tags' battery drain. The main power drain on the battery is from the receiver and CPU. In the present solution, these components are only active for a few seconds per day (out of 86,400 seconds). The rest of the time the RFID tags can capture energy for charging the battery from the received RF energy and other sources of energy harvesting. This allows for a very small, low cost rechargeable battery or capacitor. A rechargeable energy storage is not required. For some applications, a primary battery (e.g., a lithium coin cell) can be used without recharging. If a small battery can supply energy for the expected life time of the tag, then a fixed battery could be used to reduce the costs. For example, a swing ticket could have a small battery that lasts less than one year.

Novel feature (A) further improves tag read range which reduces infrastructure costs. Using battery assisted tags changes the tag read range from, for example, 1-10 meters to 15-100 meters. This significantly reduces infrastructure installation costs since less tag readers are needed to cover a given area as compared to that needed in conventional systems, while improving overall performance in previously hard to read areas.

Novel feature (B) ensures that tags in motion respond to interrogation signals even at times when they are not scheduled to communicate during time slots. The system can now track an RFID tag while it is in motion and also detect where/when this tag motion stops. Novel feature (B) also facilitates better inventory counts, improved read ranges, and reduced infrastructure costs.

Illustrative Systems

Referring now to FIG. 1, there is provided a schematic illustration of an illustrative system 100 that is useful for understanding the present solution. The present solution is described herein in relation to a retail store environment. The present solution is not limited in this regard, and can be used in other environments. For example, the present solution can be used in distribution centers, factories and other commercial environments. Notably, the present solution can be employed in any environment in which objects and/or items need to be located and/or tracked.

The system 100 is generally configured to allow improved inventory counts of objects and/or items located within a facility. As shown in FIG. 1, system 100 comprises a Retail Store Facility ("RSF") 128 in which display equipment $102_1, \ldots, 102_M$ is disposed. The display equipment is provided for displaying objects (or items) $110_1\text{-}110_N$, $116_1\text{-}116_X$ to customers of the retail store. The display equipment can include, but is not limited to, shelves, article display cabinets, promotional displays, fixtures and/or equipment securing areas of the RSF 128. The RSF can also include emergency equipment (not shown), checkout counters and an EAS system (not shown). Emergency equipment, checkout counters, video cameras, people counters, and EAS systems are well known in the art, and therefore will not be described herein.

At least one tag reader 120 is provided to assist in counting the objects $110_1\text{-}110_N$, $116_1\text{-}116_X$ located within the RSF 128. The tag reader 120 comprises an RFID reader configured to read RFID tags. RFID readers are well known in the art, and therefore will not be described herein. Any known or to be known RFID reader can be used herein without limitation.

RFID tags $112_1\text{-}112_N$, $118_1\text{-}118_X$ are respectively attached or coupled to the objects $110_1\text{-}110_N$, $116_1\text{-}116_X$. The RFID tags are described herein as comprising single-technology tags that are only RFID enabled. The present solution is not limited in this regard. The RFID tags can alternatively or additionally comprise dual-technology tags that have both EAS and RFID capabilities.

Notably, the tag reader 120 is strategically placed at a known location within the RSF 128. By correlating the tag reader's RFID tag reads and the tag reader's known location within the RSF 128, it is possible to determine the location of objects $110_1, \ldots, 110_N$, $116_1, \ldots, 116_X$ within the RSF 128. The tag reader's known coverage area also facilitates object location determinations. Accordingly, RFID tag read information and tag reader location information is stored in a data store 126. This information can be stored in the data store 126 using a server 124. Server 124 will be described in more detail below in relation to FIG. 4.

Figure 2:
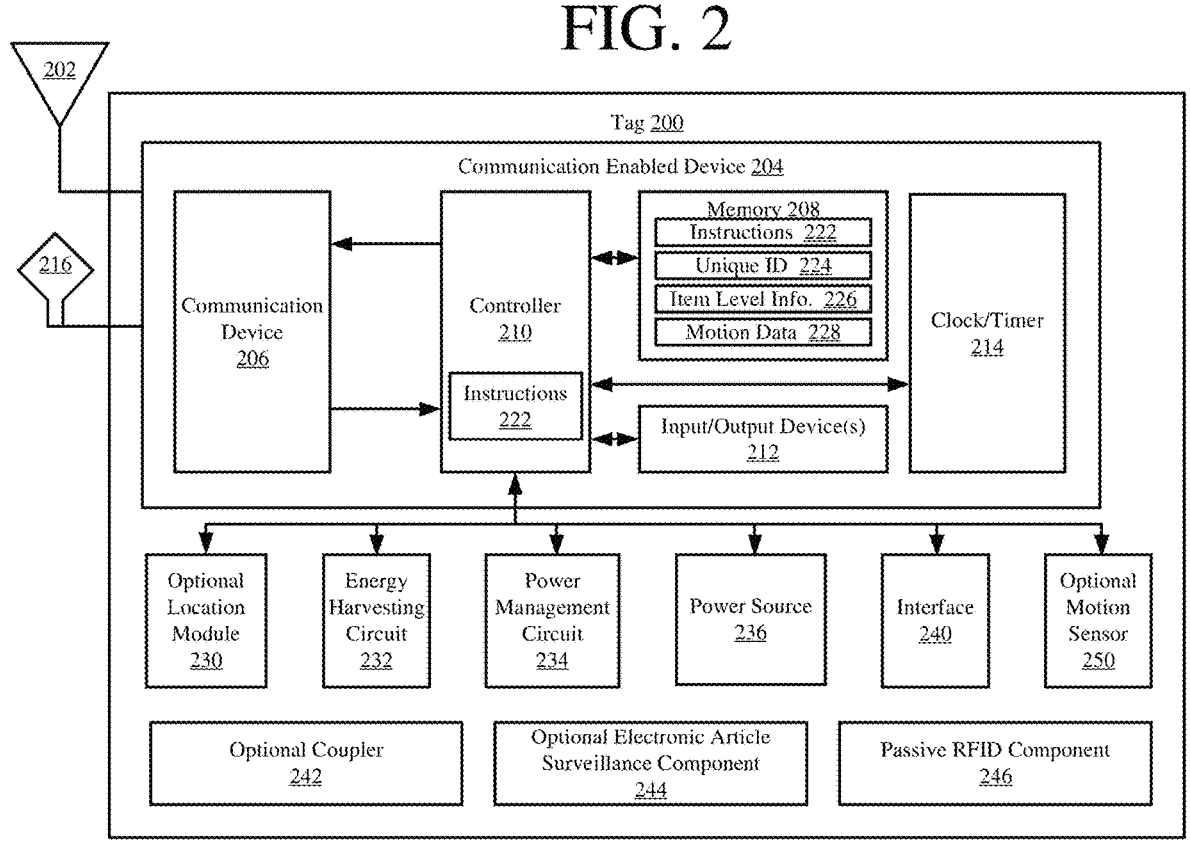
FIG. 2 is an illustration of an illustrative architecture for a tag.

Referring now to FIG. 2, there is an illustration of an illustrative architecture for a tag 200. RFID tags $112_1, \ldots, 112_N$, $118_1, \ldots, 118_X$ re the same as or similar to tag 200. As such, the discussion of tag 200 is sufficient for understanding the RFID tags $112_1, \ldots, 112_N$, $118_1, \ldots, 118_X$ of FIG. 1. Tag 200 is generally configured to perform operations to (a) minimize power usage so as to extend a power source's life (e.g., a battery or a capacitor), (b) minimize collisions with other tags so that the tag of interest can be seen at given times, (c) optimize useful information within an inventory system (e.g., communicate useful change information to a tag reader), and/or (d) optimize local feature functions.

The tag 200 can include more or less components than that shown in FIG. 2. However, the components shown are sufficient to disclose an illustrative embodiment implementing the present solution. Some or all of the components of the tag 200 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 2 represents a representative tag 200 configured to facilitate improved inventory management. In this regard, the tag 200 is configured for allowing data to be exchanged with an external device (e.g., tag reader 120 of FIG. 1 and/or server 124 of FIG. 1) via wireless communication technology. The wireless communication technology can include, but is not limited to, a Radio Frequency Identification ("RFID") technology, a Near Field Communication ("NFC") technology, and/or a Short Range Communication ("SRC") technology. For example, one or more of the following wireless communication technologies (is)are employed: Radio Frequency ("RF") communication technology; Bluetooth technology; WiFi technology; beacon technology; and/or LiFi technology. Each of the listed wireless communication technologies is well known in the art, and therefore will not be described in detail herein. Any known or to be known wireless communication technology or other wireless communication technology can be used herein without limitation.

The components 206-214 shown in FIG. 2 may be collectively referred to herein as a communication enabled device 204, and include a memory 208 and a clock/timer 214. Memory 208 may be a volatile memory and/or a non-volatile memory. For example, the memory 208 can include, but is not limited to, Random Access Memory ("RAM"), Dynamic RAM ("DRAM"), Static RAM ("SRAM"), Read Only Memory ("ROM") and flash memory. The memory 208 may also comprise unsecure memory and/or secure memory.

In some scenarios, the communication enabled device 204 comprises a Software Defined Radio ("SDR"). SDRs are well known in the art, and therefore will not be described in detail herein. However, it should be noted that the SDR can be programmatically assigned any communication protocol that is chosen by a user (e.g., RFID, WiFi, LiFi, Bluetooth, BLE, Nest, ZWave, Zigbee, etc.). The communication protocols are part of the device's firmware and reside in memory 208. Notably, the communication protocols can be downloaded to the device at any given time. The initial/default role (being an RFID, WiFi, LiFi, etc. tag) can be assigned at the deployment thereof. If the user desires to use another protocol at a later time, the user can remotely change the communication protocol of the deployed tag 200. The update of the firmware, in case of issues, can also be performed remotely.

As shown in FIG. 2, the communication enabled device 204 comprises at least one antenna 202, 216 for allowing data to be exchanged with the external device via a wireless communication technology (e.g., an RFID technology, an NFC technology and/or a SRC technology). The antenna 202, 216 is configured to receive signals from the external device and/or transmit signals generated by the communication enabled device 204. The antenna 202, 216 can comprise a near-field or far-field antenna. The antennas include, but are not limited to, a chip antenna or a loop antenna.

The communication enabled device 204 also comprises a communication device (e.g., a transceiver or transmitter) 206. Communication devices (e.g., transceivers or transmitters) are well known in the art, and therefore will not be described herein. However, it should be understood that the communication device 206 generates and transmits signals (e.g., RF carrier signals) to external devices, as well as receives signals (e.g., RF signals) transmitted from external devices. In this way, the communication enabled device 204 facilitates the registration, identification, location and/or tracking of an item (e.g., object 110 or 112 of FIG. 1) to which the tag 200 is coupled.

The communication enabled device 204 is configured so that it: communicates (transmits and receives) in accordance with a time slot communication scheme; and selectively enables/disables/bypasses the communication device (e.g., transceiver) or at least one communications operation based on output of a motion sensor 250. In some scenarios, the communication enabled device 204 selects: one or more time slots from a plurality of time slots based on the tag's unique identifier 224 (e.g., an Electronic Product Code ("EPC")); and/or determines a Window Of Time ("WOT") during which the communication device (e.g., transceiver) 206 is to be turned on or at least one communications operation is be enabled subsequent to when motion is detected by the motion sensor 250. The WOT can be determined based on environmental conditions (e.g., humidity, temperature, time of day, relative distance to a location device (e.g., beacon or location tag), etc.) and/or system conditions (e.g., amount of traffic, interference occurrences, etc.). In this regard, the tag 200 can include additional sensors not shown in FIG. 2.

The communication enabled device 204 also facilitates the automatic and dynamic modification of item level information 226 that is being or is to be output from the tag 200 in response to certain trigger events. The trigger events can include, but are not limited to, the tag's arrival at a particular facility (e.g., RSF 128 of FIG. 1), the tag's arrival in a particular country or geographic region, a date occurrence, a time occurrence, a price change, and/or the reception of user instructions.

Item level information 226 and a unique identifier ("ID") 224 for the tag 200 can be stored in memory 208 of the communication enabled device 204 and/or communicated to other external devices (e.g., tag reader 120 of FIG. 1 and/or server 124 of FIG. 1) via communication device (e.g., transceiver) 206 and/or interface 240 (e.g., an Internet Protocol or cellular network interface). For example, the communication enabled device 204 can communicate information specifying a timestamp, a unique identifier for an item, item description, item price, a currency symbol and/or location information to an external device. The external device (e.g., server) can then store the information in a database (e.g., database 126 of FIG. 1) and/or use the information for various purposes.

The communication enabled device 204 also comprises a controller 210 (e.g., a CPU) and input/output devices 212. The controller 210 can execute instructions 222 implementing methods for facilitating inventory counts and management. In this regard, the controller 210 includes a processor (or logic circuitry that responds to instructions) and the memory 208 includes a computer-readable storage medium on which is stored one or more sets of instructions 222 (e.g., software code) configured to implement one or more of the methodologies, procedures, or functions described herein. The instructions 222 can also reside, completely or at least partially, within the controller 210 during execution thereof by the tag 200. The memory 208 and the controller 210 also can constitute machine-readable media. The term "machine-readable media", as used here, refers to a single medium or multiple media (e.g., a centralized or distributed database, and/or associated caches and servers) that store the one or more sets of instructions 222. The term "machine-readable media", as used here, also refers to any medium that is capable of storing, encoding or carrying a set of instructions 222 for execution by the tag 200 and that cause the tag 200 to perform any one or more of the methodologies of the present disclosure.

The input/output devices can include, but are not limited to, a display (e.g., an E Ink display, an LCD display and/or an active matrix display), a speaker, a keypad and/or light emitting diodes. The display is used to present item level information in a textual format and/or graphical format. Similarly, the speaker may be used to output item level information in an auditory format. The speaker and/or light emitting diodes may be used to output alerts for drawing a person's attention to the tag 200 (e.g., when motion thereof has been detected) and/or for notifying the person of a particular pricing status (e.g., on sale status) of the item to which the tag is coupled.

The clock/timer 214 is configured to determine a date, a time, and/or an expiration of a pre-defined period of time. Technique for determining these listed items are well known in the art, and therefore will not be described herein. Any known or to be known technique for determining these listed items can be used herein without limitation.

The tag 200 also comprises an optional location module 230. The location module 230 is generally configured to determine the geographic location of the tag at any given time. For example, in some scenarios, the location module 230 employs Global Positioning System ("GPS") technology and/or Internet based local time acquisition technology. The present solution is not limited to the particulars of this example. Any known or to be known technique for determining a geographic location can be used herein without limitation including relative positioning within a facility or structure.

The optional coupler 242 is provided to securely or removably couple the tag 200 to an item (e.g., object 110 or 112 of FIG. 1). The coupler 242 includes, but is not limited to, a mechanical coupling means (e.g., a strap, clip, clamp, snap) and/or adhesive (e.g., glue or sticker). The coupler 242 is optional since the coupling can be achieved via a weld and/or chemical bond.

The tag 200 can also include a power source 236, an optional Electronic Article Surveillance ("EAS") component 244, and/or a passive/active/semi-passive RFID component 246. Each of the listed components 236, 244, 246 is well known in the art, and therefore will not be described herein.

Any known or to be known battery, EAS component and/or RFID component can be used herein without limitation. The power source 236 can include, but is not limited to, a rechargeable battery and/or a capacitor.

As shown in FIG. 2, the tag 200 further comprises an energy harvesting circuit 232 and a power management circuit 234 for ensuring continuous operation of the tag 200 without the need to change the rechargeable power source (e.g., a battery). In some scenarios, the energy harvesting circuit 232 is configured to harvest energy from one or more sources (e.g., heat, light, vibration, magnetic field, and/or RF energy) and to generate a relatively low amount of output power from the harvested energy. By employing multiple sources for harvesting, the device can continue to charge despite the depletion of a source of energy. Energy harvesting circuits are well known in the art, and therefore will not be described herein. Any known or to be known energy harvesting circuit can be used herein without limitation.

As noted above, the tag 200 may also include a motion sensor 250. Motion sensors are well known in the art, and therefore will not be described herein. Any known or to be known motion sensor can be used herein without limitation. For example, the motion sensor 250 includes, but is not limited to, a vibration sensor, an accelerometer, a gyroscope, a linear motion sensor, a Passive Infrared ("PIR") sensor, a tilt sensor, and/or a rotation sensor.

The motion sensor 250 is communicatively coupled to the controller 210 such that it can notify the controller 210 when tag motion is detected. The motion sensor 250 also communicates sensor data to the controller 210. The sensor data is processed by the controller 210 to determine whether or not the motion is of a type for triggering enablement of the communication device (e.g., transceiver) 206 or at least one communications operation. For example, the sensor data can be compared to stored motion data 228 to determine if a match exists therebetween. More specifically, a motion pattern specified by the sensor data can be compared to a plurality of motion patterns specified by the stored motion data 228. The plurality of motion patterns can include, but are not limited to, a motion pattern for walking, a motion pattern for running, a motion pattern for vehicle transport, and/or a motion pattern for vibration caused by equipment or machinery in proximity to the tag (e.g., an air conditioner or fan). The type of movement (e.g., vibration or being carried) is then determined based on which stored motion data matches the sensor data. This feature of the present solution allows the tag 200 to selectively enable the communication device (e.g., transceiver) or at least one communications operation only when the tag's location within a facility is actually being changed (e.g., and not when a fan is causing the tag to simply vibrate).

In some scenarios, the tag 200 can be also configured to enter a sleep state in which at least the motion sensor triggering of communication operations is disabled. This is desirable, for example, in scenarios when the tag 200 is being shipped or transported from a distributor to a customer. In those or other scenarios, the tag 200 can be further configured to enter the sleep state in response to its continuous detection of motion for a given period of time. The tag can be transitioned from its sleep state in response to expiration a defined time period, the tag's reception of a control signal from an external device, and/or the tag's detection of no motion for a period of time.

The power management circuit 234 is generally configured to control the supply of power to components of the tag 200. In the event all of the storage and harvesting resources deplete to a point where the tag 200 is about to enter a shutdown/brownout state, the power management circuit 234 can cause an alert to be sent from the tag 200 to a remote device (e.g., tag reader 120 or server 124 of FIG. 1). In response to the alert, the remote device can inform an associate (e.g., a store employee) so that (s)he can investigate why the tag 200 is not recharging and/or holding charge.

The power management circuit 234 is also capable of redirecting an energy source to the tag's 200 electronics based on the energy source's status. For example, if harvested energy is sufficient to run the tag's 200 function, the power management circuit 234 confirms that all of the tag's 200 storage sources are fully charged such that the tag's 200 electronic components can be run directly from the harvested energy. This ensures that the tag 200 always has stored energy in case harvesting source(s) disappear or lesser energy is harvested for reasons such as drop in RF, light or vibration power levels. If a sudden drop in any of the energy sources is detected, the power management circuit 234 can cause an alert condition to be sent from the tag 200 to the remote device (e.g., tag reader 120 or server 124 of FIG. 1). At this point, an investigation may be required as to what caused this alarm. Accordingly, the remote device can inform the associate (e.g., a store employee) so that (s)he can investigate the issue. It may be that other merchandise are obscuring the harvesting source or the item is being stolen.

The present solution is not limited to that shown in FIG. 2. The tag 200 can have any architecture provided that it can perform the functions and operations described herein. For example, all of the components shown in FIG. 2 can comprise a single device (e.g., an Integrated Circuit ("IC")). Alternatively, some of the components can comprise a first tag element (e.g., a Commercial Off The Shelf ("COTS") tag) while the remaining components comprise a second tag element communicatively coupled to the first tag element. The second tag element can provide auxiliary functions (e.g., motion sensing, etc.) to the first tag element. The second tag element may also control operational states of the first tag element. For example, the second tag element can selectively (a) enable and disable one or more features/operations of the first tag element (e.g., transceiver operations), (b) couple or decouple an antenna to and from the first tag element, (c) bypass at least one communications device or operation, and/or (d) cause an operational state of the first tag element to be changed (e.g., cause transitioning the first tag element between a power save mode and non-power save mode). In some scenarios, the operational state change can be achieved by changing the binary value of at least one state bit (e.g., from 0 to 1, or vice versa) for causing certain communication control operations to be performed by the tag 200. Additionally or alternatively, a switch can be actuated for creating a closed or open circuit. The present solution is not limited in this regard.

Figure 3:
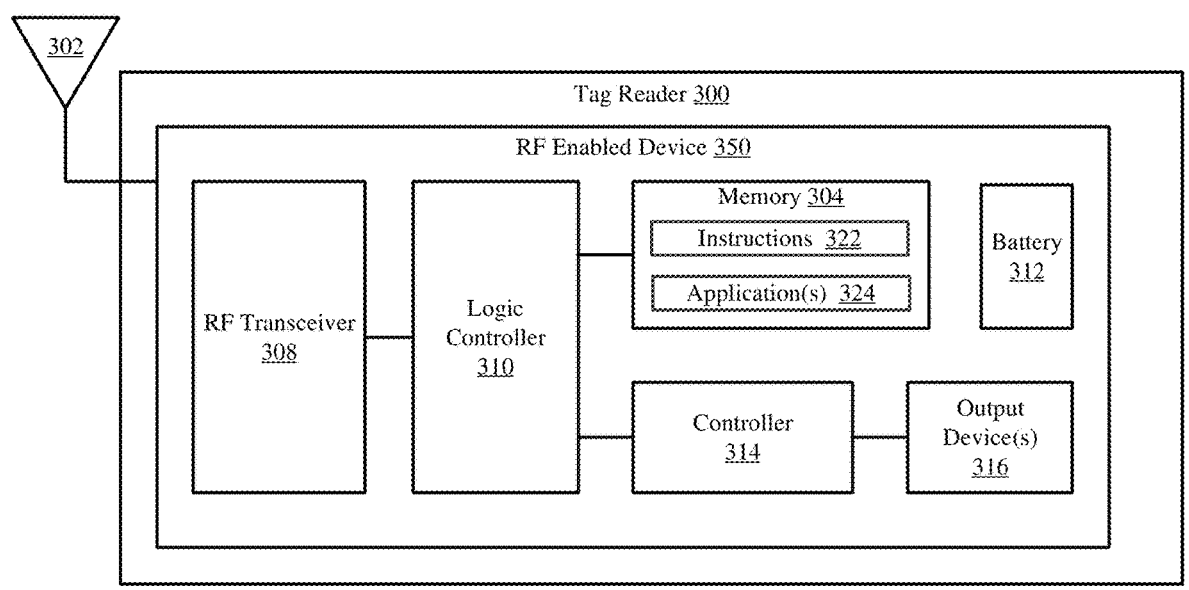
FIG. 3 is an illustration of an illustrative architecture for a tag reader.

Referring now to FIG. 3, there is provided a detailed block diagram of an exemplary architecture for a tag reader 300. Tag reader 120 of FIG. 1 is the same as or similar to tag reader 200. As such, the discussion of tag reader 200 is sufficient for understanding tag reader 120.

Tag reader 300 may include more or less components than that shown in FIG. 3. However, the components shown are sufficient to disclose an illustrative embodiment implementing the present solution. Some or all of the components of the tag reader 300 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 3 represents an illustration of a representative tag reader 300 configured to facilitate improved inventory counts and management within an RSF (e.g., RSF 128 of FIG. 1). In this regard, the tag reader 200 comprises an RF enabled device 350 for allowing data to be exchanged with an external device (e.g., RFID tags $112_1, \ldots, 112_N, 118_1, \ldots, 118_X$ of FIG. 1) via RF technology. The components 304-316 shown in FIG. 3 may be collectively referred to herein as the RF enabled device 350, and may include a power source 312 (e.g., a battery) or be connected to an external power source (e.g., an AC mains).

The RF enabled device 350 comprises an antenna 302 for allowing data to be exchanged with the external device via RF technology (e.g., RFID technology or other RF based technology). The external device may comprise RFID tags $112_1, \ldots, 112_N, 118_1, \ldots, 118_X$ of FIG. 1. In this case, the antenna 302 is configured to transmit RF carrier signals (e.g., interrogation signals) to the listed external devices, and/or transmit data response signals (e.g., authentication reply signals) generated by the RF enabled device 350. In this regard, the RF enabled device 350 comprises an RF transceiver 308. RF transceivers are well known in the art, and therefore will not be described herein. However, it should be understood that the RF transceiver 308 receives RF signals including information from the transmitting device, and forwards the same to a logic controller 310 for extracting the information therefrom.

The extracted information can be used to determine the presence, location and/or type of movement of an RFID tag within a facility (e.g., RSF 128 of FIG. 1). Accordingly, the logic controller 310 can store the extracted information in memory 304, and execute algorithms using the extracted information. For example, the logic controller 310 can correlate tag reads with beacon reads to determine the location of the RFID tags within the facility. The logic controller 310 can also perform pattern recognition operations using sensor data received from RFID tags and comparison operations between recognized patterns and pre-stored patterns. The logic controller 310 can further select a time slot from a plurality of time slots based on a tag's unique identifier (e.g., an EPC), and communicate information specifying the selected time slot to the respective RFID tag. The logic controller 310 may additionally determine a WOT during which a given RFID tag's communication device (e.g., transceiver) or operation(s) is(are) to be turned on when motion is detected thereby, and communicate the same to the given RFID tag. The WOT can be determined based on environmental conditions (e.g., temperature, time of day, etc.) and/or system conditions (e.g., amount of traffic, interference occurrences, etc.). Other operations performed by the logic controller 310 will be apparent from the following discussion.

Notably, memory 304 may be a volatile memory and/or a non-volatile memory. For example, the memory 304 can include, but is not limited to, a RAM, a DRAM, an SRAM, a ROM, and a flash memory. The memory 304 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

Instructions 322 are stored in memory for execution by the RF enabled device 350 and that cause the RF enabled device 350 to perform any one or more of the methodologies of the present disclosure. The instructions 322 are generally operative to facilitate determinations as to whether or not RFID tags are present within a facility, where the RFID tags are located within a facility, and/or which RFID tags are in motion at any given time. Other functions of the RF enabled device 350 will become apparent as the discussion progresses.

Figure 4:
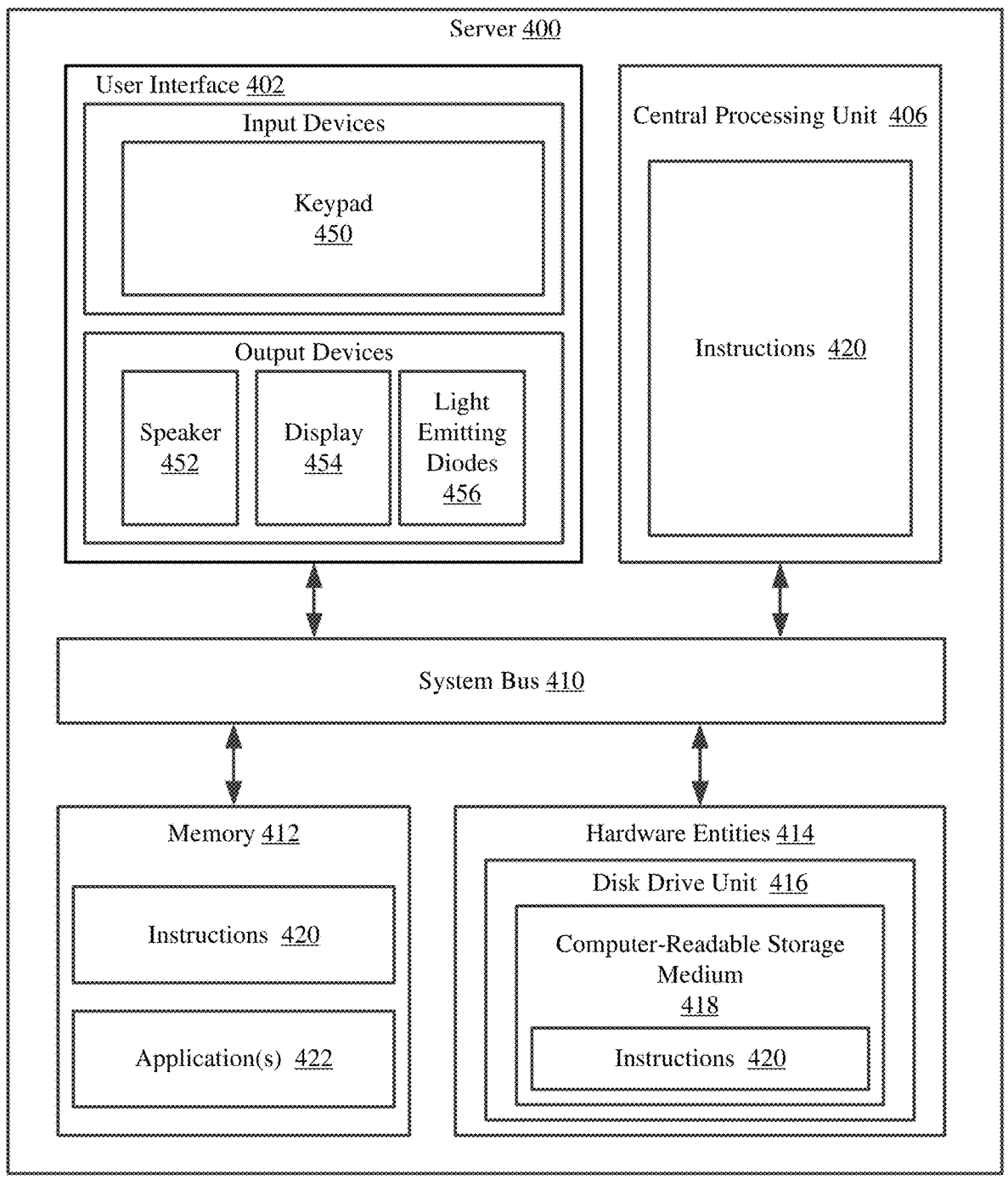
FIG. 4 is an illustration of an illustrative architecture for a server.

Referring now to FIG. 4, there is provided a detailed block diagram of an exemplary architecture for a server 400. Server 124 of FIG. 1 is the same as or substantially similar to server 400. As such, the following discussion of server 400 is sufficient for understanding server 124.

Notably, the server 400 may include more or less components than those shown in FIG. 4. However, the components shown are sufficient to disclose an illustrative embodiment implementing the present solution. The hardware architecture of FIG. 4 represents one embodiment of a representative server configured to facilitate inventory counts and management. As such, the server 400 of FIG. 4 implements at least a portion of a method for determining inventory using time slotted tag communications in accordance with the present solution.

Some or all the components of the server 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the server 400 comprises a user interface 402, a CPU 406, a system bus 410, a memory 412 connected to and accessible by other portions of server 400 through system bus 410, and hardware entities 414 connected to system bus 410. The user interface can include input devices (e.g., a keypad 450) and output devices (e.g., speaker 452, a display 454, and/or light emitting diodes 456), which facilitate user-software interactions for controlling operations of the server 400.

At least some of the hardware entities 414 perform actions involving access to and use of memory 412, which can be a RAM, a disk driver and/or a Compact Disc Read Only Memory ("CD-ROM"). Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the server 400. The memory 412 and the CPU 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the server 400 and that cause the server 400 to perform any one or more of the methodologies of the present disclosure.

In some scenarios, the hardware entities 414 include an electronic circuit (e.g., a processor) programmed for facilitating the provision of a three-dimensional map showing locations of RFID tags within a facility and/or changes to said locations in near real-time. In this regard, it should be understood that the electronic circuit can access and run a software application 422 installed on the server 400. The software application 422 is generally operative to facilitate: the determination of RFID tag locations within a facility; the direction of travel of RFID tags in motion; and the mapping of the RFID tag locations and movements in a virtual three dimensional space. Other functions of the software application 422 will become apparent as the discussion progresses. Such other functions can relate to tag reader control and/or tag control.

Referring now to FIGS. 5-6, there are provided illustrations that are useful for understanding certain advantages of the present solution. As noted above, the present solution provides RFID tags which can be read by a tag reader located farther away therefrom as compared to that of conventional systems. FIG. 5 shows a tag reader layout for a conventional system. In FIG. 5, there are 20 tag readers 502 with overlapping coverage areas 508. The distance 504, 506 between adjacent tag readers is relatively small (e.g., 9-15 feet apart). In contrast, FIG. 6 shows a tag reader layout for a system implementing the present solution. In FIG. 6, there are advantageously a significantly smaller number of tag readers 602 needed to cover the same area. Accordingly, the distances 606, 608 (e.g., 90-150 feet apart) between adjacent tag readers 602 is much greater than the distances 504, 506 of FIG. 5. Consequently, the present solution has a less resource intensive and less costly infrastructure.

Illustrative Methods For Locating An RF Enabled-Device In A Facility

Figure 7A:
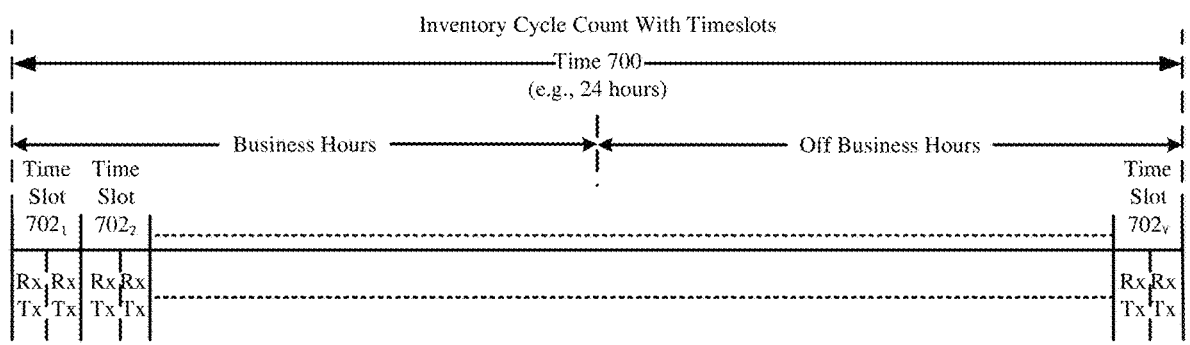
FIGS. 7A-7B (collectively referred to herein as "FIG. 7") provide illustrations that are useful for understanding an inventory cycle count using time slots for communications between tag readers and tags.

Referring now to FIG. 7, there are provided illustrations that are useful for understanding methods for determining inventory using time slotted tag communications. As shown in FIG. 7A, a period of time 700 (e.g., a 24 hour period) is segmented into a plurality of time slots $702_1, 702_2, \ldots, 702_Y$ having equal lengths (e.g., 1 second). During each time slot, at least one RFID tag (e.g., RFID tag $112_1$ of FIG. 1) (A) receives ("Rx") an interrogation signal transmitted from a tag reader (e.g., tag reader 120 of FIG. 1) and (B) transmits ("Tx") a response signal.

Figure 7B:
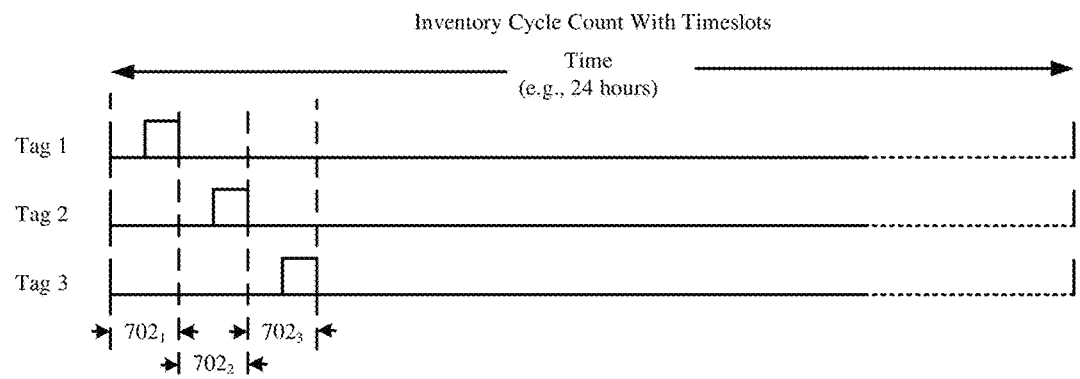

In some scenarios such as that shown in FIG. 7B, a single RFID tag is assigned to each time slot. For example, a first RFID tag is assigned to the first time slot $702_1$. A second RFID tag is assigned to a second time slot $702_2$. A third RFID tag is assigned to a third time slot $702_3$. This time slot assignment can be performed in accordance with a chaotic, random or pseudo-random number algorithm. Alternatively, the time slot assignment can be determined based on the unique codes of the tags (e.g., EPCs, Cyclic Redundancy Check ("CRC") codes, hash codes or outputs of randomizing algorithms). The time slot assignment can be performed by the RFID tags (e.g., RFID tags $112_1, \ldots, 112_N$, $118_1, \ldots, 118_X$ of FIG. 1), tag readers (e.g., tag reader(s) 120 of FIG. 1), and/or a remote server (e.g., server 124 of FIG. 1).

In some scenarios, the time slot allocations can be dynamically changed during system operations. For example, a relatively large number of tag read collisions are occurring in the system (e.g., system 100 of FIG. 1). Accordingly, the time slot allocations are changed so as to minimize such tag read collisions. The manner in which time slots are re-allocated can be determined by a single device (e.g., server 124 of FIG. 1) or by a plurality of devices (e.g., RFID tags $112_1, \ldots, 112_N$, $118_1, \ldots, 118_X$, tag readers 120 and/or server 124 of FIG. 1).

Figure 8:
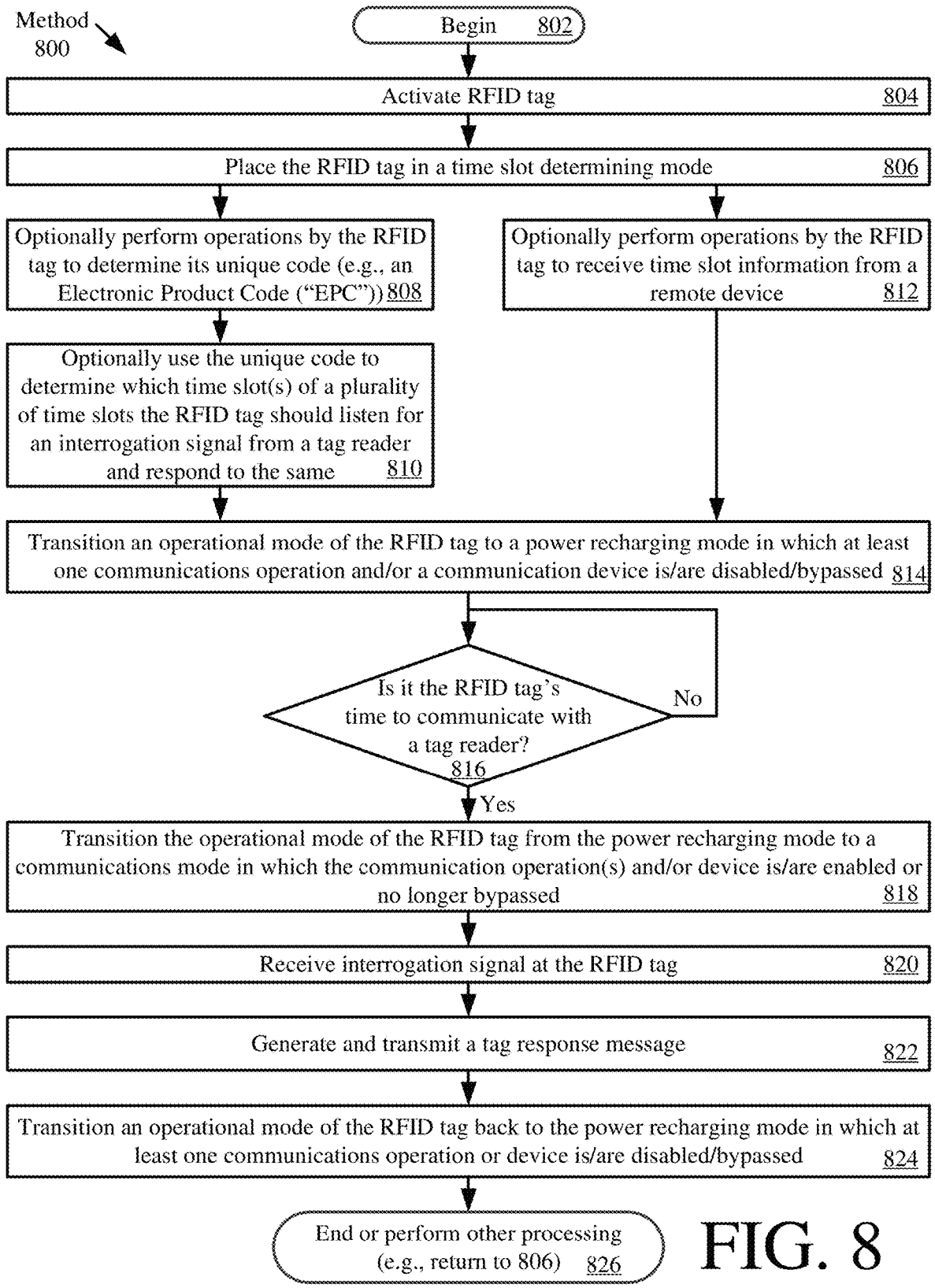
FIG. 8 is a flow diagram of an illustrative method for an inventory cycle count using time slots for communications between tag readers and tags.

Referring now to FIG. 8, there is a flow diagram of an illustrative method 800 for determining an inventory using a time slotted communications scheme such as that shown in FIGS. 7A-7B. Method 800 begins with 802 and continues with 804-806 where an RFID tag (e.g., RFID tags $112_1, \ldots, 112_N$, $118_1, \ldots,$ or $118_X$ of FIG. 1) is activated and placed in a time slot determining mode.

In the time slot determining mode, the RFID tag is assigned to a time slot (e.g., time slot $702_1$ of FIG. 7) of a plurality of time slots (e.g., time slots $702_1, 702_2, \ldots, 702_Y$ of FIG. 7). This is achieved through (I) operations performed by the RFID tag and/or (II) operations performed by a remote device (e.g., tag reader 120 of FIG. 1 or server 124 of FIG. 1).

In the first case (I), operations 808-810 are performed by the RFID tag. These operations involve: determining the RFID tag's unique code (e.g., unique ID 224 of FIG. 2); and using the unique code to determine which time slot(s) the RFID tag should listen for an interrogation signal from a tag reader and respond to the same. In this regard, the RFID tag can be programed with an algorithm for translating the unique code to a time slot value or with a look-up table indicating a mapping of unique codes to time slot values. The translation can be achieved by using the unique code as an input to a pre-defined algorithm to compute a time slot value.

In the second case (II), operations are performed by the remote device(s). These operations involve: selectively assigning at least one time slot to the RFID tag; and communicating information identifying the selectively assigned time slot(s) to the RFID tag. The time slot assignment can be on a chaotic/random/pseudo-random algorithm and/or in accordance with a unique code-to-time slot translation or mapping scheme. Accordingly, FIG. 8 includes optional block 812 where the RFID tag receives time slot information from a remote device.

Upon completing 810 or 812, method 800 continues with 814 where an operational mode of the RFID tag is transitioned from the time slot determining mode to a power recharging mode. In some scenarios, the operational state or mode change is achieved by changing the binary value of at least one state or mode bit (e.g., from 0 to 1, or vice versa) for causing certain communication control operations to be performed by the RFID tag. Additionally or alternatively, a switch can be actuated for creating a closed or open circuit. The present solution is not limited in this regard.

In the power recharging mode, a rechargeable power source (e.g., power source 236 of FIG. 2) is recharged using energy (e.g., RF energy) harvested by an energy harvesting circuit (e.g., energy harvesting circuit 232 of FIG. 2) of the RFID tag. Notably, at least one communication operation and/or the RFID tag's communication device (e.g., communication device 206 of FIG. 2) is disabled or bypassed in the power recharging mode. Other functions/operations of the RFID tag may also be disabled in this mode for power conservation purposes.

Next, a decision is made as to whether it is time for the RFID tag to communicate with a tag reader. This decision can be achieved using knowledge of the time slot(s) assigned to the particular tag. If it is not the RFID tag's time to communicate with a tag reader [816:NO], then method 800 returns to 816. In contrast, if it is the RFID tag's time to communicate with a tag reader [816:YES], then method 800 continues with 818 where the operational mode of the RFID tag is transitioned from the power recharging mode to a communications mode in which at least one communications operations and/or communication device (e.g., transceiver) is enabled or no longer bypassed. Thereafter in 820, an interrogation signal is received at the RFID tag. Interrogation signals are well known in the art, and therefore will not be described herein. In response to the interrogation signal, the RFID tag generates and transmits a tag response message, as shown by 822. Tag response messages are well known in the art, and therefore will not be described herein. Still, it should be noted that the tag response message can include the RFID tag's unique identifier (e.g., unique identifier 224 of FIG. 2) therein. The present solution is not limited to the particulars of 820-822. For example, a number of iterations of communications operations (e.g., transmit and receive operations) can be performed prior to continuing to 824.

Next in 824, the operational mode of the RFID tag is transitioned back to the power recharging mode in which at least communications operations and/or device (e.g., transceiver) is/are disabled and/or bypassed. Subsequently, 826 is performed where method 800 ends or other processing is performed (e.g., return to 806).

The method 800 described above provides a solution to real time inventory, but does not include a way to detect changes to inventory due to removal of RFID tags from an RSF (e.g., RSF 128 of FIG. 1) between respective adjacent time slots (e.g., because of sale or theft). Accordingly, method 800 can be modified to include additional operations for detecting and accounting for tag movement at all times during an inventorying process. Such a modified method is discussed below in relation to FIGS. 9-13.

Figure 9:
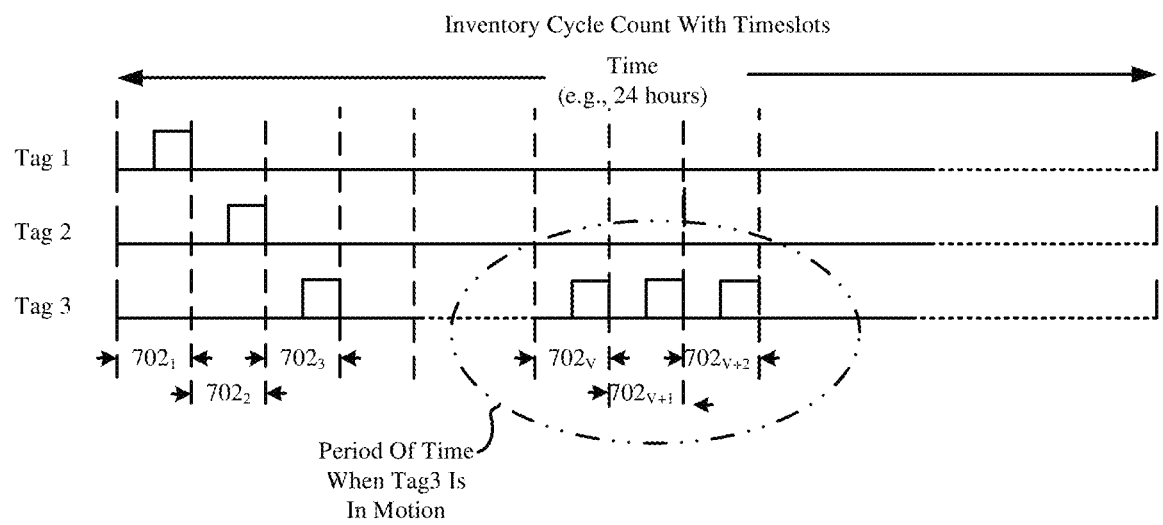
FIG. 9 is an illustration that is useful for understanding an inventory cycle count in which (a) time slots are used for communications between tag readers and tags and (b) a detection of tag motion causes communication enablement.

Referring now to FIG. 9, there is provided an illustration that is useful for understanding methods for determining inventory using motion triggered time slotted tag communications. As shown in FIG. 9, the third tag performs communication (e.g., transceiver) operations in time slots $702_V$, $702_{V+1}$, $702_{V+2}$ in addition to its assigned time slot $702_3$. These time slots $702_V$, $702_{V+1}$, $702_{V+2}$ occur during a period of time when the third tag is in motion. This allows tag readers to see moving RFID tags quickly, as well as helps at a Point Of Sale ("POS") and to determine whether the RFID tags were moved into a high risk area (e.g., a fitting room or bathroom).

Referring now to FIGS. 10-11, there are provided illustrations that are useful in understanding the contents of tag response messages. In some scenarios, the tag response message 1000 includes only a unique tag identifier 1002 (e.g., unique ID 224 of FIG. 2). In other scenarios, the tag response message 1100 includes a motion indicator 1104 in addition to the unique tag identifier 1102. The motion indicator 1104 indicates whether the tag is currently in motion, is in a given operational state/mode, and/or has a given motion sensor state.

Figure 12A:
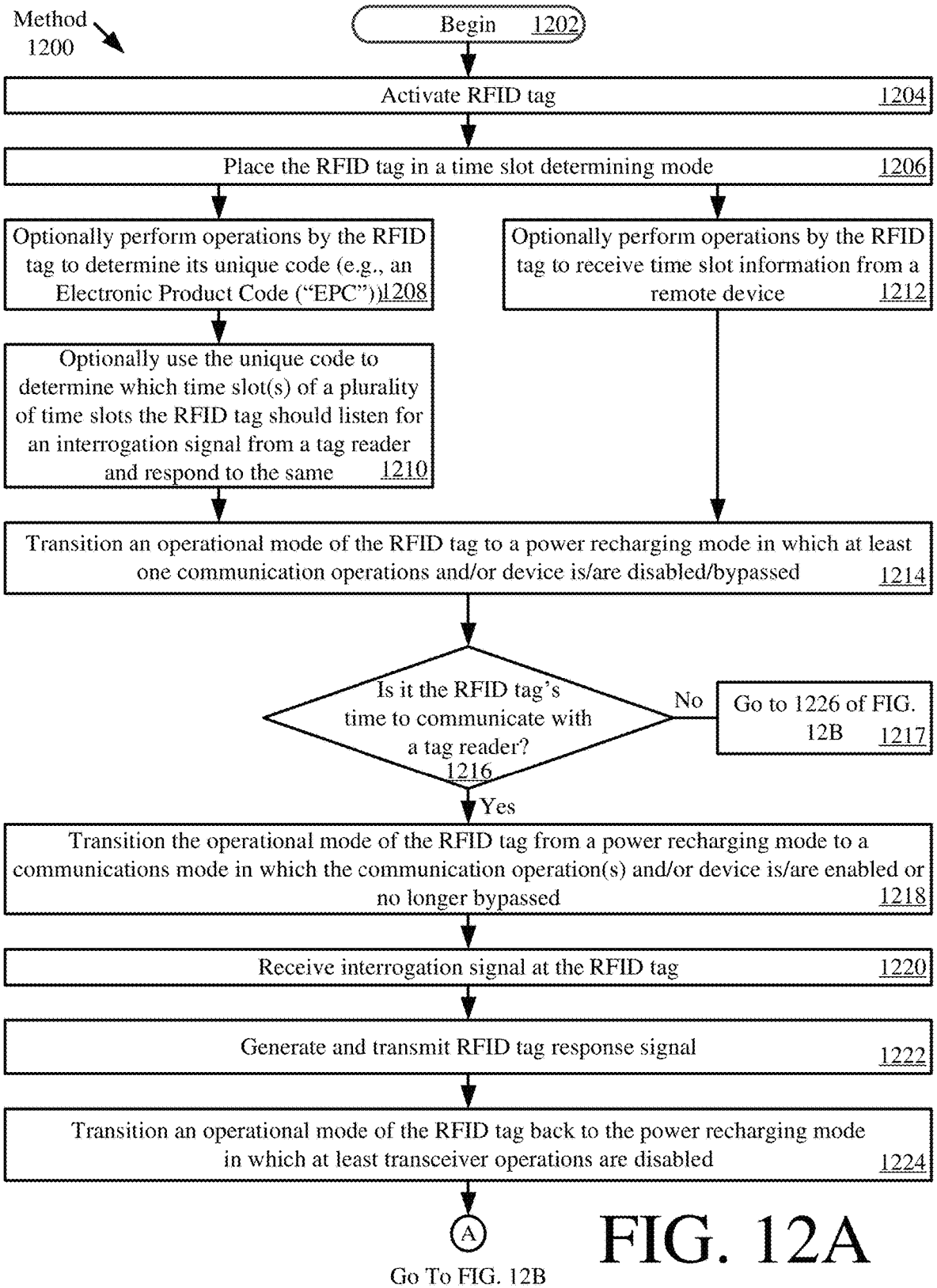
FIGS. 12A-12B (collectively referred to herein as "FIG. 12") provide a flow diagram of an illustrative method for an inventory cycle count.
Figure 12B:
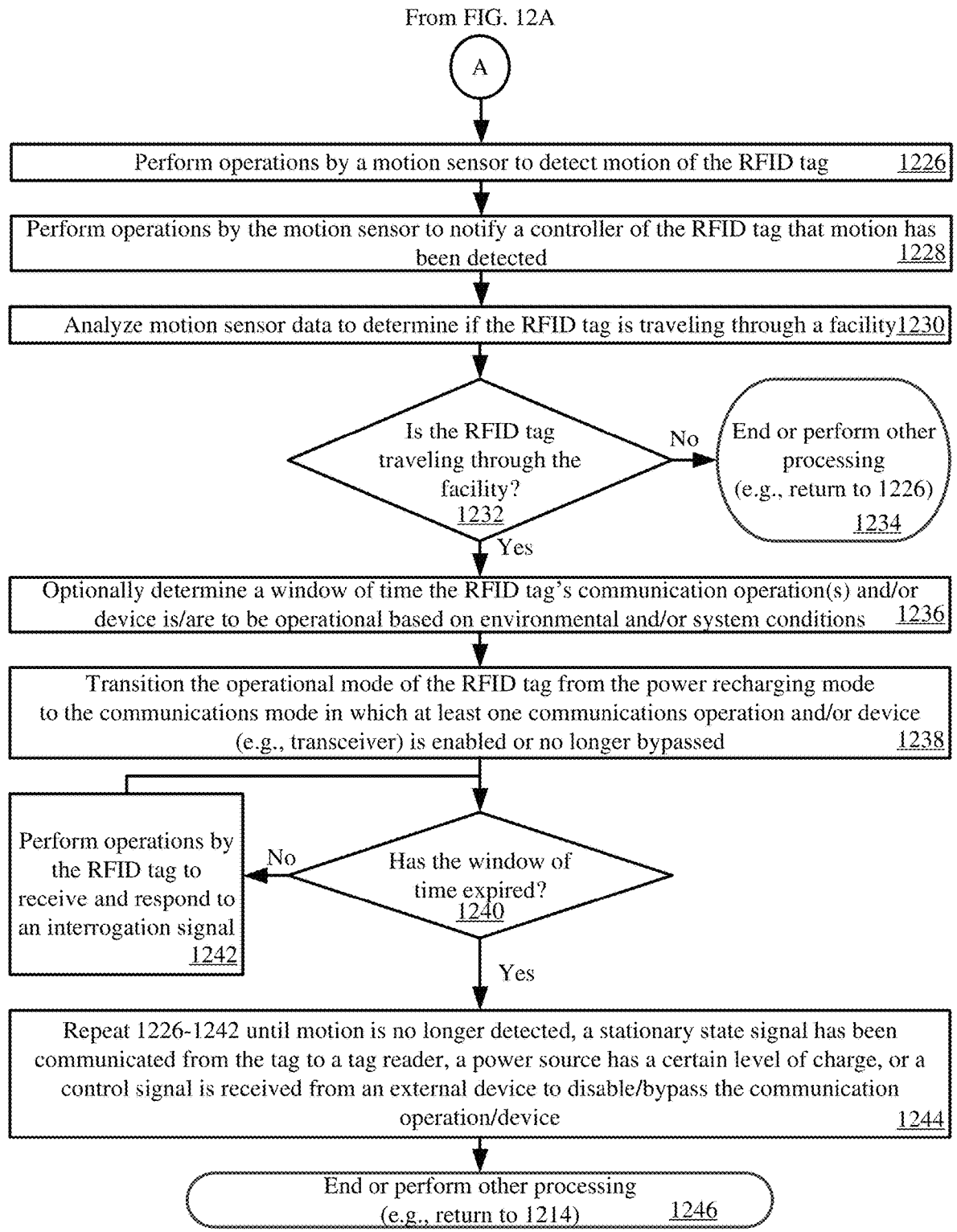

Referring now to FIG. 12, there is provided a flow diagram of an illustrative method 1200 for determining inventory using time slotted tag communications. Method 1200 begins with 1202 and continues with 1204-1224. 1204-1224 are the same as or substantially similar to 804-824 of FIG. 8. The above discussion of 804-824 is sufficient for understanding 1204-1224. Notably, a new block 1217 is provided in which method 800 continues to 1226 of FIG. 12B when a determination is made in 1216 that it is not the RFID tag's time to communicate with the tag reader.

Upon completing 1224, method 1200 continues with 1226 of FIG. 12B. As shown in FIG. 12B, 1226 involves performing operations by a motion sensor (e.g., motion sensor 250 of FIG. 2) to detect motion of the RFID tag (e.g., RFID tag $112_1$, ..., $112_N$, $118_1$, ..., or $118_X$ of FIG. 1). Next in 1228, the motion sensor performs operations to notify a controller (e.g., controller 210 of FIG. 2) of the RFID tag that motion has been detected. The motion sensor also provides motion sensor data to the controller. In 1230, the motion sensor data is analyzed to determine if the RFID tag is traveling through a facility. This analysis can be performed by the RFID tag's controller and/or a remote device (e.g., a tag reader or server). The analysis can involve detecting pre-defined patterns of movement specified in the motion sensor data (e.g., a walking pattern, a running pattern, or a vehicle traveling pattern). If a determination is made that the RFID tag is not traveling through a facility (e.g., RSF 128 of FIG. 1) [1232:NO], then 1234 is performed where method 1200 ends or other processing is performed (e.g., return to 1226).

In contrast, if a determination is made that the RFID tag is traveling through a facility [1232:YES], then 1236 is optionally performed where a WOT is determined during which the RFID tag's communication operation(s) and/or communication device (e.g., transceiver) is to be operational, enabled or no longer bypassed. 1236 is optional since the RFID tag can be pre-programed with a WOT value. In other scenarios, a value for the WOT is determined by the RFID tag and/or a remote device. The WOT value is determined based on environmental conditions and/or system conditions. Notably, the WOT value is variable. This feature of the present solution allows minimization of the RFID tag's system power, minimizes tag read collisions, and identification of moving RFID tags without reading all static/stationary RFID tags.

Once the RFID tag has knowledge of the WOT value, then 1238 is performed where its operational mode is transitioned from the power recharging mode to the communications mode in which at least one communication operation and/or communication device (e.g., transceiver) is enabled or no longer bypassed. In the communications mode, the RFID tag uses an internal clock/timer (e.g., clock/timer 214 of FIG. 1) to determine if the WOT has expired. If not [1240:NO], then the RFID tag performs operations in 1242 to receive and respond to at least one interrogation signal. In so [1240:YES], then 1226-1242 are repeated until motion is no longer detected, a stationary state signal has been communicated from the tag to a tag reader, a power source (e.g., power source 236 of FIG. 2) has a certain level of charge, and/or a control signal is received from an external device to disable or bypass the communication operations and/or device (e.g., transceiver). Subsequently, 1246 is performed where method 1200 ends or other processing is performed (e.g., return to 1214 of FIG. 12A).

The present solution has many advantages. For example, the present solution: solves real time, daily, accurate inventory with a low cost tag reader infrastructure; solves an overhead RFID as EAS problem; is able to accurately track moving tags; identify tags leaving a store even when there are a relatively large number of tags in proximity to the exit; and improves ecommerce processes by providing accurate inventory count and RFID tag locations at all times. The present solution is also greener since it limits the amount of time RF devices are enabled.

The present solution can be used in conjunction with other sensors, such as proximity sensors. For example, if proximity sensors detect the presence of individuals in the facility, then the stationary tag readers can be temporarily disabled (e.g., until there are no more people in the facility).

The RFID tags of the present solution are relatively small with good read range. This allows the RFID tags to be added to animals (e.g., humans, pets, etc.). In this case, the RFID tags can be configured to have enabled communication operations and/or devices (e.g., transceivers) only during times of detected movement thereof. The RFID tags could also be placed on wearable items (e.g., hats, belts, etc.) in a manner that does not interfere with the wearing humans.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for determining an inventory, comprising:
   placing a Radio Frequency Identification ("RFID") tag of a plurality of RFID tags in a first operational mode in which at least one communication operation or device of the RFID tag is disabled or bypassed;
   performing first operations by the RFID tag to determine when it is time to begin communications in accordance with a first time slot of a plurality of time slots of a time slotted communications scheme, the first time slot having been allotted to the RFID tag according to a unique code of the RFID tag, and the time slotted communications scheme allotting respective time slots of the plurality of time slots to the plurality of RFID tags;
   transitioning an operational mode of the RFID tag from the first operational mode to a second operational mode in which the at least one communication operation or device of the RFID tag is enabled or no longer bypassed, in response to a determination that it is time for the RFID tag to begin communications and the RFID tag is in motion; and
   transitioning the operational mode of the RFID tag back into the first operational mode when the RFID tag's communications with a remote tag reader are complete or the first time slot has expired.

2. The method according to claim 1, wherein the first operational mode comprises a power recharging mode in which a rechargeable power source is charged using harvested ambient energy.

3. The method according to claim 1, further comprising receiving at least one time slot of the plurality of time slots of the time slotted communication scheme.

4. The method according to claim 3, wherein the at least one time slot is assigned to the RFID tag based on the unique code of the RFID tag.

5. The method according to claim 4, wherein the unique code of the RFID tag comprises an Electronic Product Code ("EPC"), a Cyclic Redundancy Check ("CRC") code, a hash code or output of a randomizing algorithm.

6. The method according to claim 3, wherein the at least one time slot is assigned to the RFID tag based on a chaotic, random or pseudo-random algorithm.

7. The method according to claim 1, further comprising performing communication operations by the RFID tag in time slots of a plurality of time slots that are allocated to other RFID tags, when the RFID tag is in motion.

8. The method according to claim 7, further comprising discontinuing the communication operations when motion is no longer detected, a power source of the RFID tag has a certain level of charge, or a control signal for disabling or bypassing the communication operations is received from an external device.

9. The method according to claim 1, further comprising performing operations by a motion sensor of the RFID tag to detect that the RFID tag is in motion.

10. The method according to claim 9, further comprising transitioning the operational mode of the RFID tag from the first operational mode to the second operational mode, in response to the determination that the motion is of a type for triggering communication operations or device enablement.

11. The method according to claim 10, further comprising performing operations by the RFID tag to notify the remote tag reader that motion has been detected by the motion sensor.

12. The method according to claim 10, further comprising transitioning the RFID tag back into the first operational mode when a window of time has expired.

13. The method according to claim 12, wherein a value of the window of time is variable.

14. The method according to claim 13, wherein the value of the window of time is dynamically determined based on at least one of an environmental condition and a system operational condition.

15. A method for determining an inventory, comprising:
   placing a tag of a plurality of tags in a first operational mode in which at least one communication operation or device of the tag is disabled or bypassed;
   performing first operations by the tag to determine when it is time to begin communications in accordance with a first time slot of a plurality of time slots of a time slotted communications scheme, the first time slot having been allotted to the tag according to a unique code of the tag, and the time slotted communications scheme allotting respective time slots of the plurality of time slots to the plurality of tags;
   transitioning an operational mode of the tag from the first operational mode to a second operational mode in which the at least one communication operation or device of the tag is enabled or no longer bypassed, in response to a determination that it is time for the tag to begin communications and the RFID tag is in motion; and
   transitioning the operational mode of the tag back into the first operational mode when the tag's communications with a remote tag reader are complete or the first time slot has expired.

16. A Radio Frequency Identification ("RFID") tag, comprising:
   a processor; and
   a non-transitory computer-readable storage medium comprising programming instructions that are configured to cause the processor to implement a method for determining an inventory, wherein the programming instructions comprise instructions to:
      place the RFID tag in a first operational mode in which at least one communication operation or device of the RFID tag is disabled or bypassed, a plurality of RFID tags comprising the RFID tag;
      perform first operations to determine when it is time to begin communications in accordance with a first time slot of a plurality of time slots of a time slotted communications scheme, the first time slot having been allotted to the RFID tag according to a unique code of the RFID tag, and the time slotted communications scheme allotting respective time slots of the plurality of time slots to the plurality of RFID tags;

transition an operational mode of the RFID tag from the first operational mode to a second operational mode in which the at least one communication operation or device of the RFID tag is enabled or no longer bypassed, in response to a determination that it is time for the RFID tag to begin communications and the RFID tag is in motion; and transition the operational mode of the RFID tag back into the first operational mode when the RFID tag's communications with a remote tag reader are complete or the first time slot has expired.

17. The RFID tag according to claim 16, wherein the first operational mode comprises a power recharging mode in which a rechargeable power source is charged using harvested ambient energy.

18. The RFID tag according to claim 16, wherein the programming instructions further comprise instructions to receive at least one time slot of the plurality of time slots of the time slotted communication scheme.

19. The RFID tag according to claim 18, wherein the at least one time slot is assigned to the RFID tag based on the unique code of the RFID tag.

20. The RFID tag according to claim 19, wherein the unique code of the RFID tag comprises an Electronic Product Code ("EPC"), a Cyclic Redundancy Check ("CRC") code, a hash code or output of a randomizing algorithm.

21. The RFID tag according to claim 18, wherein the at least one time slot is assigned to the RFID tag based on a chaotic, random or pseudo-random algorithm.

22. The RFID tag according to claim 16, wherein the programming instructions further comprise instructions to cause communication operations to be performed by the RFID tag in time slots of a plurality of time slots that are allocated to other RFID tags, when the RFID tag is in motion.

23. The RFID tag according to claim 22, wherein the programming instructions further comprise instructions to discontinue the communication operations when motion is no longer detected, a power source of the RFID tag has a certain level of charge, or a control signal for disabling or bypassing the communication operations is received from an external device.

24. The RFID tag according to claim 16, wherein the programming instructions further comprise instructions to cause operations to be performed by a motion sensor of the RFID tag to detect that the RFID tag.

25. The RFID tag according to claim 24, wherein the programming instructions further comprise instructions to transition the operational mode of the RFID tag from the first operational mode to the second operational mode, in response to the determination that the motion is of a type for triggering communication operations or device enablement.

26. The RFID tag according to claim 25, wherein the programming instructions further comprise instructions to notify the remote tag reader that motion has been detected by the motion sensor.

27. The RFID tag according to claim 25, wherein the programming instructions further comprise instructions to transition the RFID tag back into the first operational mode when a window of time has expired.

28. The RFID tag according to claim 27, wherein a value of the window of time is variable.

29. The RFID tag according to claim 28, wherein the value of the window of time is dynamically determined based on at least one of an environmental condition and a system operational condition.

* * * * *